(12) United States Patent
Hrovat et al.

(10) Patent No.: US 8,948,969 B2
(45) Date of Patent: *Feb. 3, 2015

(54) SUSPENSION CONTROL FOR PULSE/GLIDE GREEN CRUISE CONTROL

(71) Applicant: Ford Global Technologies, LLC, Dearborn, MI (US)

(72) Inventors: Davor Hrovat, Ann Abror, MI (US); Dimitar Petrov Filev, Novi, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/475,405

(22) Filed: Sep. 2, 2014

(65) Prior Publication Data

US 2014/0371986 A1  Dec. 18, 2014

Related U.S. Application Data

(63) Continuation of application No. 13/734,826, filed on Jan. 4, 2013, now Pat. No. 8,825,293.

(51) Int. Cl.
| | |
|---|---|
| *B60G 17/016* | (2006.01) |
| *B60G 23/00* | (2006.01) |
| *B60G 17/0195* | (2006.01) |
| *B60W 10/06* | (2006.01) |
| *B60W 10/22* | (2006.01) |
| *B60W 30/192* | (2012.01) |

(52) U.S. Cl.
CPC ........... *B60G 17/0195* (2013.01); *B60W 10/06* (2013.01); *B60W 10/22* (2013.01); *B60W 30/192* (2013.01)
USPC .......................................................... 701/38

(58) Field of Classification Search
CPC ..................... B60G 2800/014; B60G 17/0164; B60G 2400/0512; B60G 2400/0522; B60G 2400/0532; B60G 2400/33; B60G 2400/35; B60G 2800/982
USPC ........................................................... 701/38
See application file for complete search history.

(56) References Cited

U.S. PATENT DOCUMENTS

| | | | | |
|---|---|---|---|---|
| 6,665,597 | B1 * | 12/2003 | Hanser et al. ................... 701/37 |
| 6,763,292 | B1 * | 7/2004 | Smith et al. ..................... 701/37 |
| 7,513,508 | B2 * | 4/2009 | Malit ......................... 280/5.518 |
| 7,761,205 | B2 * | 7/2010 | Onuma et al. .................. 701/36 |
| 8,185,269 | B2 | 5/2012 | Li et al. |
| 8,340,884 | B1 * | 12/2012 | He et al. ........................ 701/103 |
| 2003/0139861 | A1 * | 7/2003 | Cayzeele et al. ............... 701/36 |
| 2003/0225495 | A1 * | 12/2003 | Coelingh et al. ............... 701/48 |
| 2005/0090956 | A1 * | 4/2005 | Ogawa ........................... 701/37 |

(Continued)

FOREIGN PATENT DOCUMENTS

EP            1302357 A1    4/2003

*Primary Examiner* — Mary Cheung
*Assistant Examiner* — Frederick Brushaber
(74) *Attorney, Agent, or Firm* — Greg Brown; Alleman Hall McCoy Russell & Tuttle LLP

(57) ABSTRACT

A method is described comprising modulating vehicle speed about a target speed by operating a vehicle with an engine at high output and then operating the vehicle with the engine off, and adjusting operation of a suspension system based on the vehicle operation with the engine at high output and the engine off to control vehicle pitch during the modulating of vehicle speed about the target speed.

20 Claims, 8 Drawing Sheets

(56) References Cited

U.S. PATENT DOCUMENTS

| | | |
|---|---|---|
| 2005/0187713 A1* | 8/2005 | Yamamura et al. ........... 701/301 |
| 2008/0172155 A1* | 7/2008 | Takamatsu et al. ............. 701/40 |
| 2008/0234900 A1 | 9/2008 | Bennett |
| 2010/0094509 A1 | 4/2010 | Lüke et al. |

* cited by examiner

FIG. 3
(Prior Art)
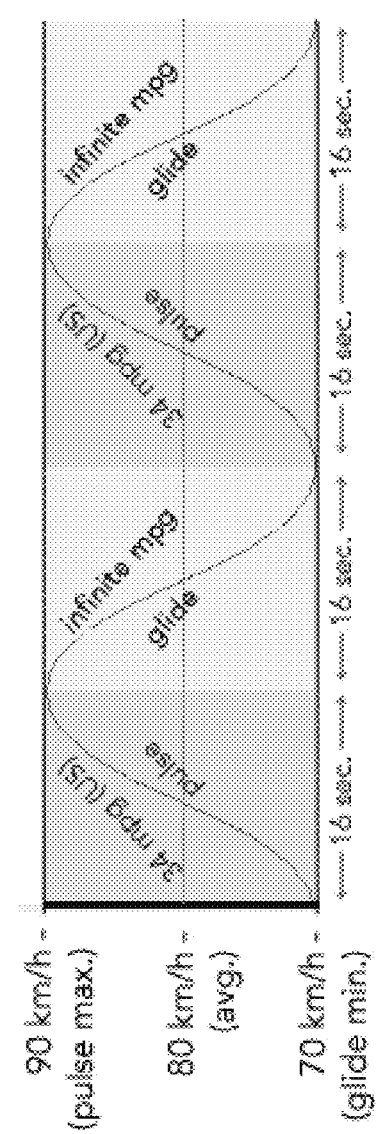
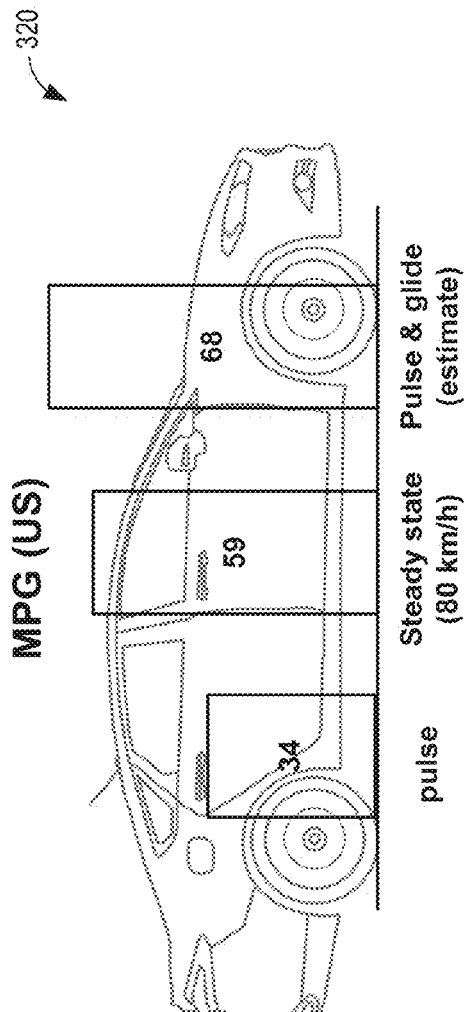

SUSPENSION CONTROL FOR PULSE/GLIDE GREEN CRUISE CONTROL

CROSS REFERENCE TO RELATED APPLICATIONS

The present application is a continuation of U.S. patent application Ser. No. 13/734,826, "SUSPENSION CONTROL FOR PULSE/GLIDE GREEN CRUISE CONTROL," filed on Jan. 4, 2013, now U.S. Pat. No. 8,825,293, the entire contents of which are hereby incorporated by reference for all purposes.

FIELD

The present description relates to improving passenger comfort in a vehicle, for example by controlling suspension systems responsive to cruise control systems to reduce vehicle pitching during periods of acceleration and deceleration.

BACKGROUND AND SUMMARY

Cruise control operation may be used for autonomously regulating a vehicle's speed near a target speed. One method that can reduce fuel consumption while operating cruise control is a Pulse and Glide (PG) speed-control strategy, where time-dependent periodic control of the vehicle's speed is implemented. During the pulse portion of the PG speed-control strategy, the vehicle is accelerated to a threshold speed above the target speed. Subsequently, the engine is shut off during the glide portion of the PG speed-control strategy, until the vehicle decelerates to a threshold speed below the target speed. By repeating this PG speed-control strategy in a periodic manner, the vehicle can be driven with an average speed equivalent to a desired target speed, but with higher fuel economy, by taking advantage of lower pumping losses during the pulse phase, during which the engine is operated close to or at wide open throttle.

The inventors herein have recognized potential issues with the PG speed-control strategy. Namely, because the PG speed-control strategy requires alternating periods of acceleration (e.g., pulsing) and deceleration (e.g., gliding), it can also cause periodic pitching of the vehicle (e.g., nose-up or squatting during pulsing, nose-down or diving while gliding) that can cause ride discomfort, especially for long drives.

One approach that addresses the aforementioned issues is a method that coordinates or synchronizes control of the vehicle suspension systems with PG speed-control strategy. In one example, a vehicle's active suspension can increase stiffness at the vehicle's rear wheels during acceleration, and can increase stiffness at the vehicle's front wheels during deceleration. In this way, the overall ride comfort can be increased, while still enabling fuel economy gains.

In another example, during pulsing and gliding, the method adjusts the vehicle suspension to reduce variation in vehicle height (e.g., front vehicle height), thereby reducing ride discomfort, while maintaining fuel economy. In another example, the method can pre-adjust the vehicle suspension in anticipation of the pulsing and gliding disturbances, based on the PG speed-control parameters, in order to further reduce ride discomfort while maintaining fuel economy.

The above advantages as well as other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is a schematic illustrating pulse and glide operation and fuel economy benefits that may be derived therefrom.

DETAILED DESCRIPTION

Figure 1:
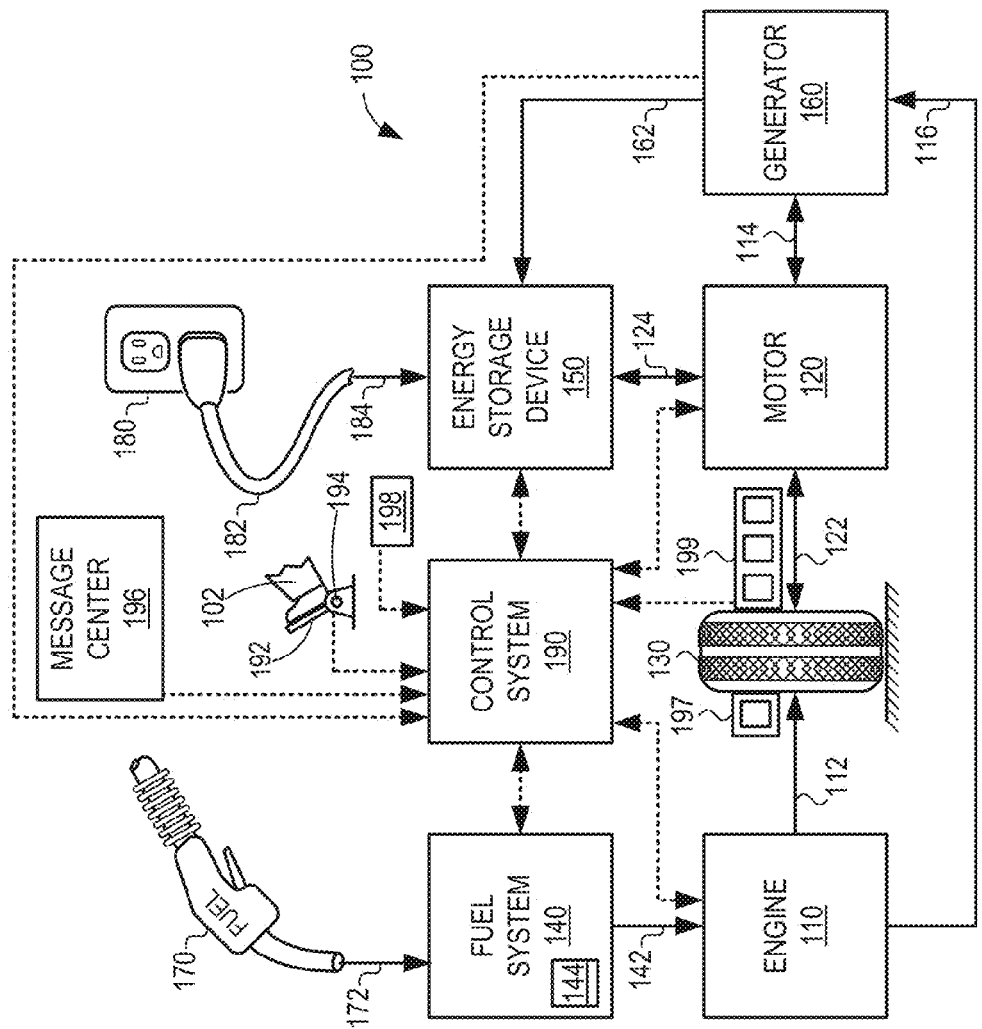
FIG. 1 shows a schematic of an example propulsion system for a vehicle, including an engine, energy storage device, fuel system, and motor.
Figure 2:
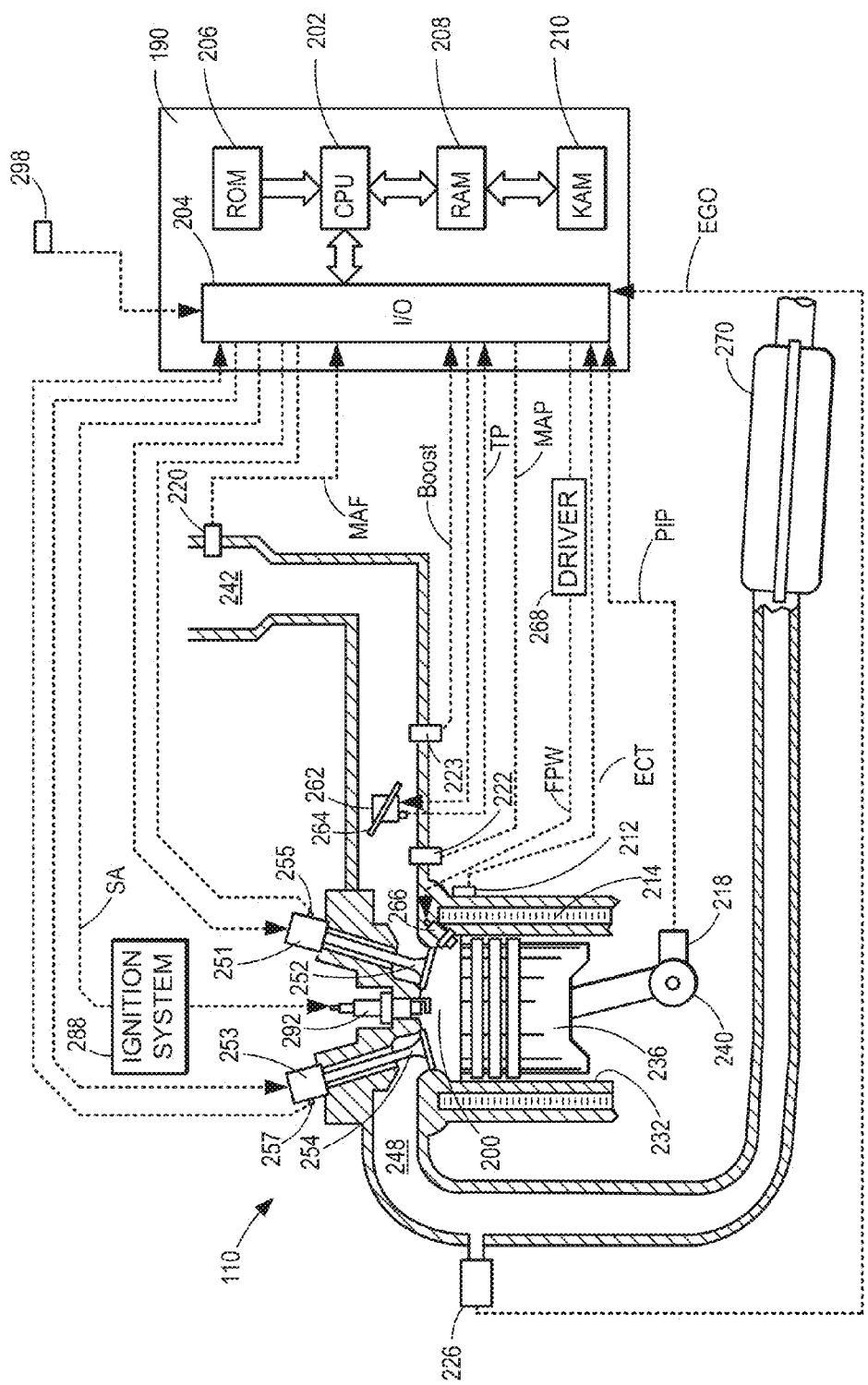
FIG. 2 shows a schematic of an example engine, including a cylinder, exhaust-gas aftertreatment device, and engine controller, which may be included in the propulsion system of FIG. 1.
Figure 4:
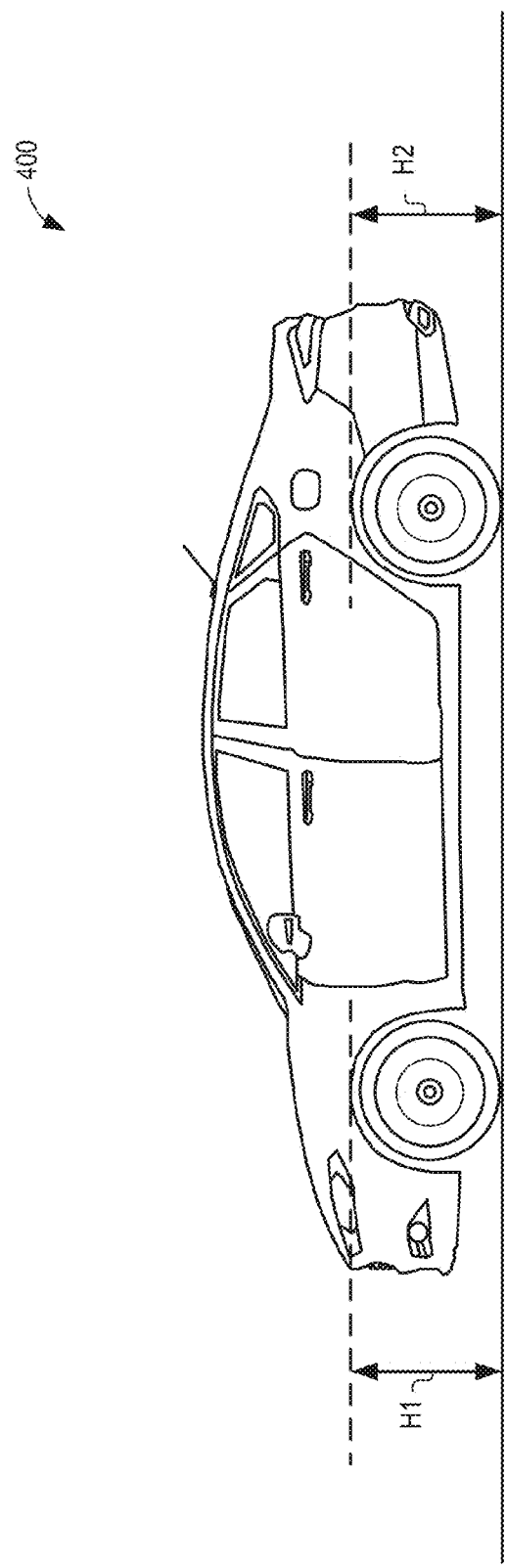
FIG. 4 is a schematic illustrating an example method of determining front and rear vehicle heights.
Figure 5:
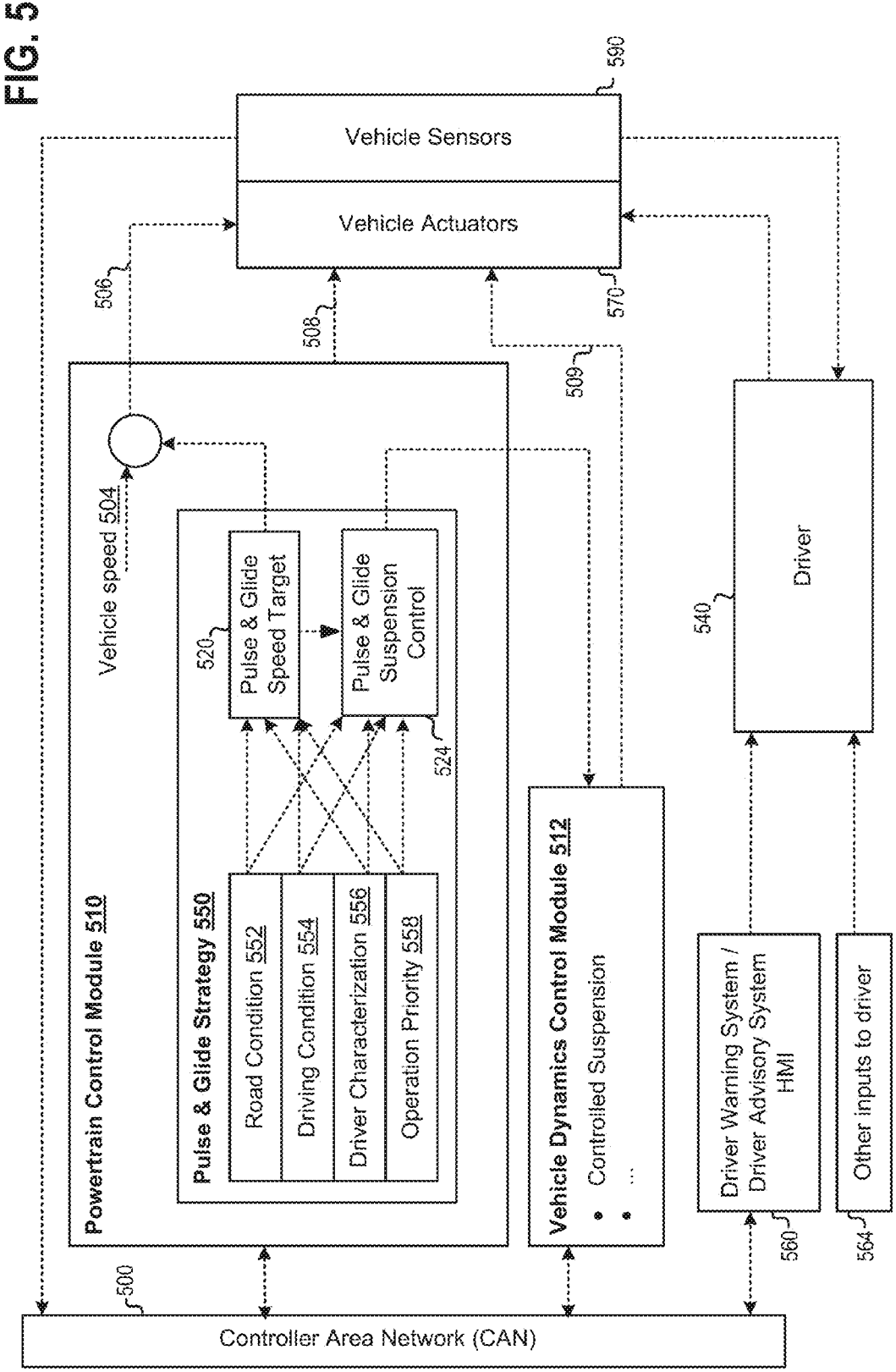
FIG. 5 is a block diagram illustrating an example configuration of a powertrain control module for coordinating suspension control with pulse and glide cruise control.
Figure 6:
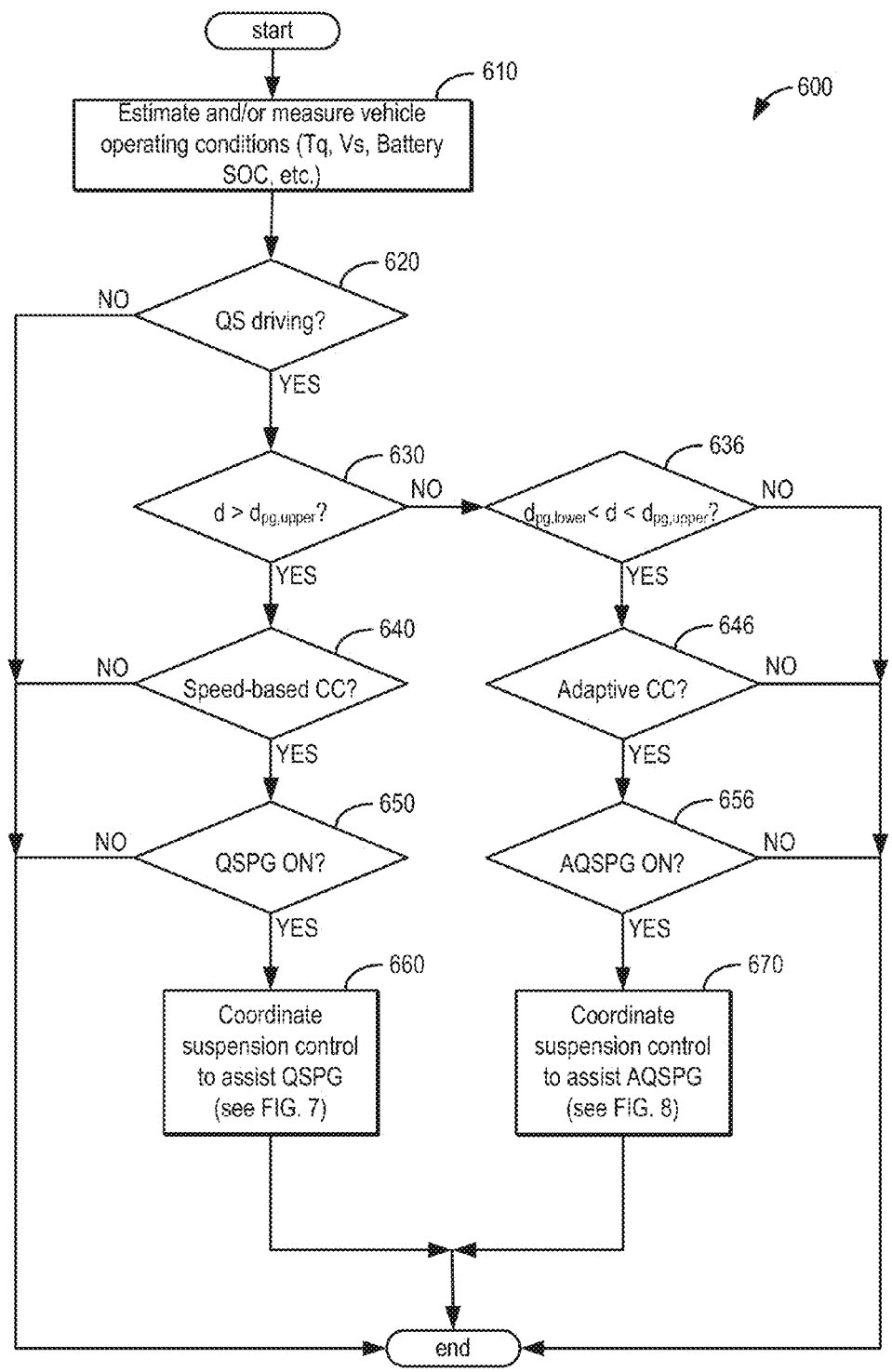
FIG. 6 is a flow chart illustrating an example method for coordinating suspension control to assist pulse and glide cruise control.
Figure 8:
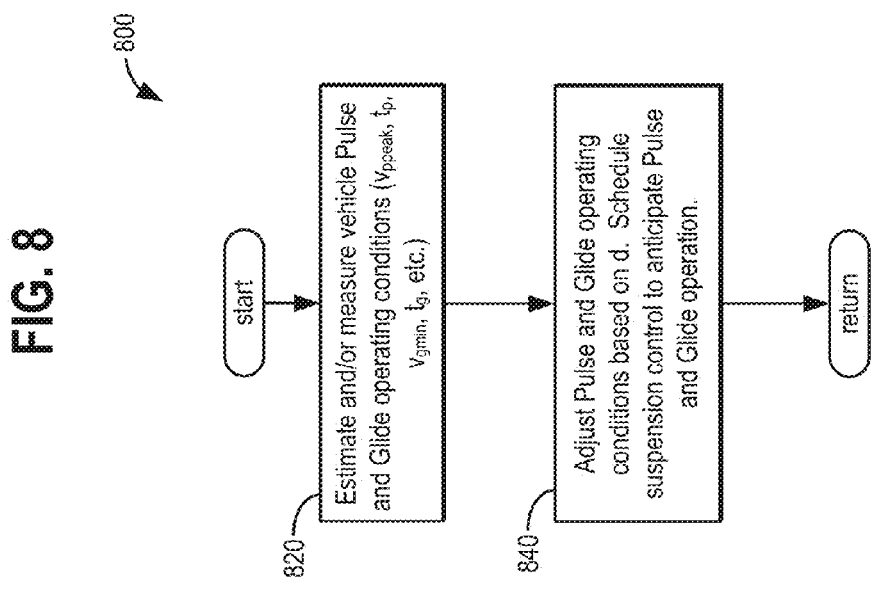
FIG. 8 is a flow chart illustrating an example method for coordinating suspension control to assist pulse glide cruise control.
Figure 7:
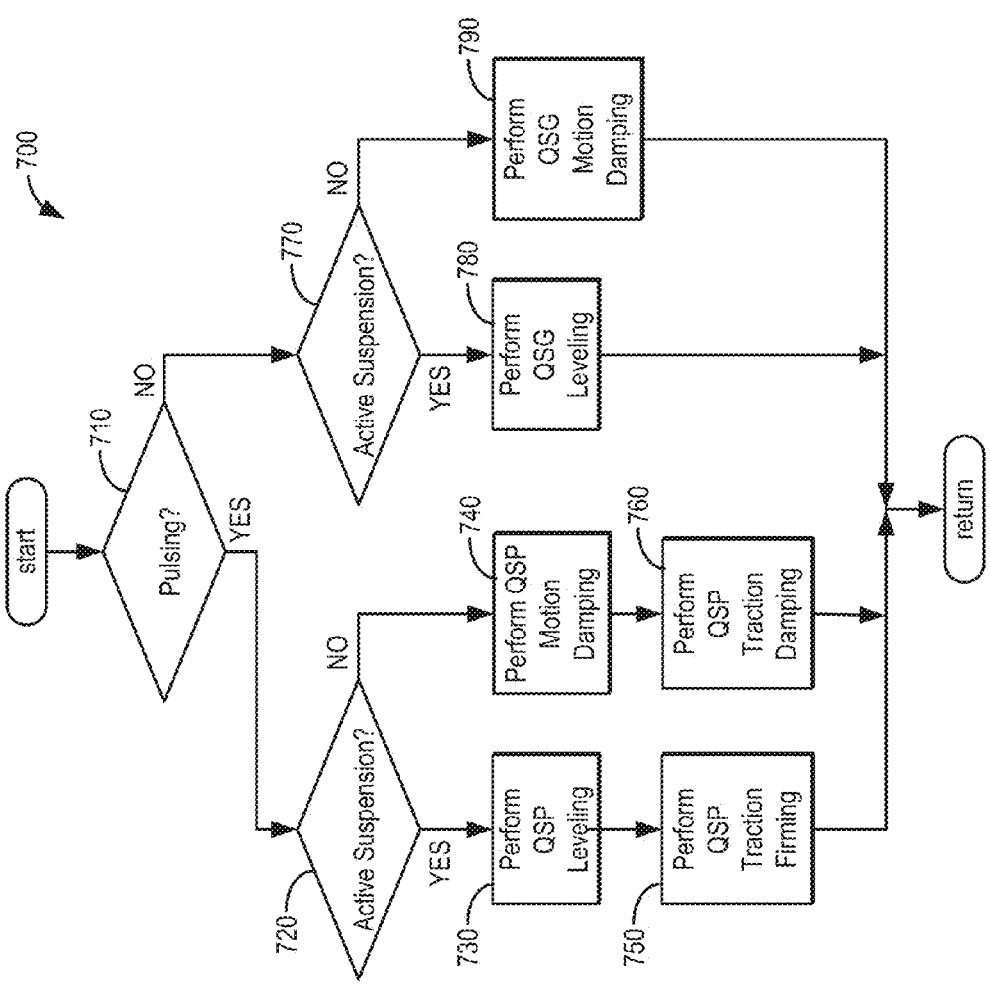
FIG. 7 is a flow chart illustrating an example method for coordinating suspension control to assist pulse glide cruise control.
Figure 9:
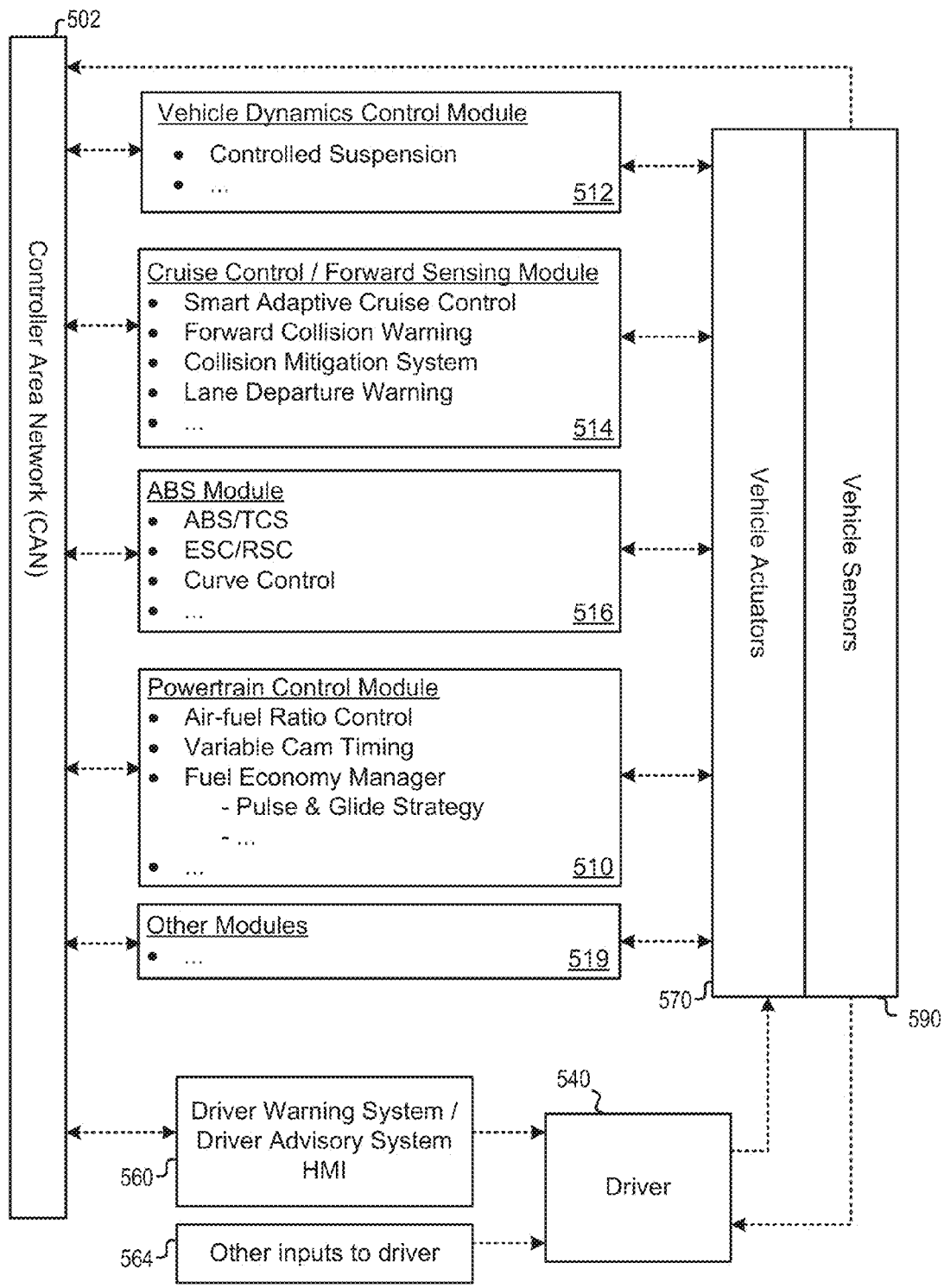
FIG. 9 is a block diagram illustrating an example configuration of various electronic control units (ECUs) in a controller area network (CAN).

The present description relates to improving passenger comfort in a vehicle by controlling suspension systems responsive to cruise control systems to reduce vehicle pitching during periods of acceleration and deceleration. FIG. 1 illustrates an example of a propulsion system for a vehicle comprising an engine, motor, generator, fuel system and control system. FIG. 2 illustrates an example of an internal combustion engine, although the systems and method disclosed can be applicable to compression ignition engines and turbines, or motorized electric vehicles without a combustion engine. FIG. 3 shows two charts illustrating Pulse and Glide (PG) operation in a vehicle and its potential impact on fuel economy. FIG. 4 shows a schematic illustrating vehicle height as it relates to vehicle suspension systems. FIG. 5 illustrates an example configuration of powertrain control module for coordinating suspension control with pulse and glide cruise control. FIGS. 6-8 show flow charts illustrating routines for coordinating suspension control with PG cruise control operation. FIG. 9 illustrates an example configuration of various electronic control units (ECUs) in a controller area network (CAN).

Turning now to FIG. 1, it illustrates an example of a vehicle propulsion system 100. Vehicle propulsion system 100 may comprise a fuel burning engine 110 and a motor 120. As a non-limiting example, engine 110 comprises an internal combustion engine and motor 120 comprises an electric motor. As such, vehicle propulsion system 100 may be a propulsion system for a hybrid-electric vehicle. However, vehicle propulsion system may also be a propulsion system for a non-hybrid vehicle, or an electric vehicle with an electric motor and no combustion engine. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). In other examples, where the vehicle propulsion system 100 is for an electric vehicle, vehicle propulsion system may be referred to as an electric vehicle (EV).

Vehicle propulsion system 100 may utilize a variety of different operational modes depending on operating conditions encountered by the vehicle propulsion system. Some of these modes may enable engine 110 to be maintained in an off state (e.g. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The vehicle propulsion system may be configured to transition between two or more of the operating modes described above depending on vehicle operating conditions. As another example, vehicle propulsion system may be a propulsion system for an electric vehicle (e.g., with no combustion engine), wherein an electric motor receiving electric power from energy storage device 150 (e.g., a battery) may propel the vehicle.

Fuel system 140 may include one or more fuel storage tanks 144 for storing fuel on-board the vehicle. For example, fuel tank 144 may store one or more liquid fuels, including but not limited to gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, an exhaust-gas grid heater, an exhaust-gas recycle cooler, etc. As a non-limiting example, energy storage device 150 may include one or more batteries and/or capacitors.

Control system 190 may communicate with one or more of engine 110, motor 120, fuel system 140, energy storage device 150, and generator 160. As will be described in FIG. 2, control system 190 may comprise controller 211 and may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. As a further non-limiting example, vehicle propulsion system 100 may be configured as a plug-in electric vehicle (EV), whereby electrical energy may be supplied to energy storage device 150 from power source 180 via an electrical energy transmission cable 182. Control system 190 may further control the output of energy or power from energy storage device 150 (e.g., a battery) depending on the electric load of vehicle propulsion system 100. For example, during reduced electrical load operation, control system 190 may step-down the voltage delivered from energy storage device 150, via a an inverter/converter, in order to save energy.

During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (state-of-charge).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion.

A plug-in hybrid electric vehicle, as described with reference to vehicle propulsion system 100, may be configured to utilize a secondary form of energy (e.g. electrical energy) that is periodically received from an energy source that is not otherwise part of the vehicle.

The vehicle propulsion system 100 may also include a message center 196, ambient temperature/humidity sensor 198, electrical load sensor 154, and a roll stability control sensor, such as a lateral and/or longitudinal and/or steering wheel position or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, GPS device, etc. In an alternative embodiment, the message center may communicate audio messages to the operator without display. Further, the sensor(s) 199 may include a vertical accelerometer to indicate road roughness and a lateral accelerometer. These devices may be connected to control system 190. In one example, the control system may adjust engine output and/or the wheel brakes to increase vehicle stability in response to sensor(s) 199.

Next, vehicle propulsion system may further comprise one or more vehicle height sensors 197 to indicate the vehicle height. As an example, there may be a single vehicle height sensor, or there may be a front vehicle height sensor and a rear vehicle height sensor indicating the front and rear vehicle heights respectively (see FIG. 4). In a further example, there may be more than two vehicle height sensors, for example, four vehicle height sensors, corresponding to each wheel of vehicle propulsion system 100. As such, control system 190 may adjust the vehicle suspension in order to increase or decrease one or more vehicle heights according to one or more respective vehicle height sensors 197.

Referring now to FIG. 2, it illustrates a non-limiting example of a cylinder 200 of engine 110, including the intake and exhaust system components that interface with the cylinder. Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with drive wheel 130, motor 120 or generator 160 via a transmission.

Cylinder 200 may receive intake air via an intake passage 242. Intake passage 242 may also communicate with other cylinders of engine 110. Intake passage 242 may include a throttle 262 including a throttle plate 264 that may be adjusted by control system 190 to vary the flow of intake air that is provided to the engine cylinders. Cylinder 200 can communicate with intake passage 242 via one or more intake valves 252. Cylinder 200 may exhaust products of combustion via an exhaust passage 248. Cylinder 200 can communicate with exhaust passage 248 via one or more exhaust valves 254.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

A non-limiting example of control system 190 is depicted schematically in FIG. 2. Control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 can communicate with various sensors and actuators of engine 110, energy storage device 150, and fuel system 140 via an input/output device 204. As a non-limiting example, these sensors may provide sensory feedback in the form of operating condition information to the control system, and may include: an indication of mass airflow (MAF) through intake passage 242 via sensor 220, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of intake valve position via sensor 255, an indication of exhaust valve position via sensor 257, an indication of electrical load via electrical load sensor 154, and an indication of proximity to vehicle traffic (e.g. distance from another vehicle traveling in front of via one or more vehicle presence sensors 298. For example, vehicle presence sensors 298 may include radar, laser, video, infrared, ultrasound, and image sensors, and/or combinations thereof to detect the presence of other vehicles in the vicinity of the vehicle.

Furthermore, the control system 190 may control operation of the engine 110, including cylinder 200 via one or more of the following actuators: driver 268 to vary fuel injection timing and quantity, ignition system 288 to vary spark timing and energy, intake valve actuator 251 to vary intake valve timing, exhaust valve actuator 253 to vary exhaust valve timing, and throttle 262 to vary the position of throttle plate 264, among others. Note that intake and exhaust valve actuators 251 and 253 may include electromagnetic valve actuators (EVA) and/or cam-follower based actuators. Further still, control system 190 may control or adjust actuators associated with the operation of the vehicle suspension.

Turning now to FIG. 3, it illustrates a first chart 310, illustrating an example of PG operation. In this example of PG operation, a vehicle travels with an average speed of 80 km/h, a target speed. As shown by the oscillating speed profile, PG operation comprises modulating the vehicle speed about the target speed (e.g., 80 km/h) over a threshold interval of 20 km/h. In other words, the vehicle first accelerates (e.g., pulse phase) from a speed of 70 km/h to a speed of 90 km/h. Subsequently, the vehicle decelerates (e.g., glide phase) from the speed of 90 km/h over the threshold interval, returning to the speed of 70 km/h. Repetition of the pulse and glide phases of the vehicle occurs continuously during PG operation. The modulation period of the PG operation is the time to complete one pulse and one glide phase. In the example illustrated in chart 310, the modulation period is 32 seconds. The modulation frequency is the reciprocal of the modulation period. For example, in chart 310, the modulation frequency is $\frac{1}{32} s^{-1}$.

PG operation may aid fuel economy since fuel consumption is limited to engine operation during the pulse phases, where the engine operates at more efficiently at high output to accelerate the vehicle. During the glide (e.g., deceleration) phases, the engine is off, and fuel is not consumed by the engine. Chart 320 illustrates the potential fuel economy benefits to PG operation. Under non-PG operation of the vehicle at a steady target speed (e.g., 80 km/h), the fuel economy is 59 miles per gallon (mpg). Under PG operation of the vehicle with an equivalent average speed equal to the target speed (e.g., 80 km/h), the fuel economy is estimated to increase to 68 mpg. Fuel economy benefits afforded by PG operation as compared to steady non-PG operation may depend on several parameters such as vehicle type, engine type, vehicle speed, road grade, and the like.

Turning now to FIG. 4 it illustrates a schematic of a vehicle 400. Vehicle 400 may comprise vehicle propulsion system 100 of FIG. 1, and cylinder 200 of engine 110. Vehicle height H1 can refer to the front vehicle height of the vehicle and can comprise the height of the front wheel well, whereas H2 can refer to the rear vehicle height of the vehicle and can comprise the height of the rear wheel well, as depicted in FIG. 4. Vehicle 400 may also comprise additional vehicle heights (e.g. H3, H4, and the like, not shown) wherein each vehicle height corresponds to the vehicle height at each vehicle drive wheel 130. As previously discussed, vehicle 400 may also comprise vehicle height sensors 197 that communicate one or more vehicle heights to control system 190.

Under certain conditions while the vehicle is in operation, vehicle heights may change relative to one another, at least momentarily. For example, when the vehicle accelerates, the rear vehicle height may compress relative to the front vehicle height (e.g., H2<H1), giving rise to nose-up vehicle squat during the acceleration period. Conversely, when the vehicle decelerates or brakes, the front vehicle height may compress relative to the rear vehicle height (e.g., H1<H2), and the vehicle may pitch forward or dive (e.g., nose-down) during the deceleration period. Accordingly, it may be desirable for reducing passenger discomfort, vehicle operation, vehicle life, and the like, to control the individual vehicle heights such that equivalent vehicle heights are maintained during periods of acceleration and deceleration.

Turning now to FIG. 5, it illustrates an example of a configuration of a Powertrain Control Module (PCM) 510 of a vehicle propulsion system 100 for a vehicle 400. PCM 510 may reside in CPU 202 of control system 190, and may comprise, for example, a Pulse and Glide (PG) Strategy submodule 550. PCM 510 may communicate with Controller Area Network (CAN) 502, and CAN 502 may communicate with other ECU modules such as Vehicle Dynamics Control Module (VDCM) 512. Both PCM 510 and VDCM 512 may receive information from vehicle sensors 590 via CAN 502, and output signals to vehicle actuators 570 via signals 506 and 508, and 509 respectively.

As a non-limiting example, vehicle sensors 590 may provide sensory feedback in the form of operating condition information to the PCM 510 via CAN 502. Vehicle sensors 590 may comprise above-mentioned sensors such as vehicle presence sensors 197 and other sensors 199, such as lateral and/or longitudinal and/or steering wheel position, yaw rate, and lateral and vertical accelerometer sensors. Vehicle sensors 590 may further comprise wheel sensors for measuring wheel torque and wheel rotational speed, imaging sensors for detecting road and traffic conditions and vehicle positioning relative to the road. Further still, vehicle sensors 590 may comprise other above-described sensors illustrated in FIG. 2.

Vehicle actuators 570 may comprise brake actuators such as brake hydraulic valves and pumps, for example, for operating the ABS. Vehicle actuators 570 may also comprise suspension system actuators such as hydraulic pumps, electromagnetic motors, solenoid valves, and electromagnetic actuators. Vehicle actuators 570 may further comprise other above-mentioned actuators illustrated in FIG. 2, and may further be actuated by control system 190 for controlling engine 110 operation such as driver 268, ignition system 288, intake valve actuator 251, exhaust valve actuator 253, and throttle 262, among others.

VDCM 512 may be used to control the actuators of a vehicle suspension system, which may be an active or semi-active suspension system. An active suspension system may comprise hydraulic pump actuated suspensions to independently adjust the suspension and/or vehicle height at each wheel to counteract vehicle pitching while in motion. As a further example, an active suspension system may also comprise an electromagnetic recuperative suspension wherein linear electromagnetic motors may be attached to each wheel to independently adjust the suspension and/or vehicle height at each wheel. An active suspension system may also comprise an adaptive (e.g. semi-active) suspension system. For example, solenoid valve actuators may be employed to vary the flow of hydraulic fluid inside the suspension system shocks to change the damping characteristics of the suspension. As a second example of an adaptive suspension system, electromagnetic actuators may be used to change the stiffness of wheel suspensions comprising magneto rheological dampers. Other types of active, semi-active, and other suspensions systems may also be used and controlled by VDCM 512.

PG Strategy submodule 550 may comprise systems for monitoring and determining the road condition 552, driving condition 554, driver characterization 556, and operation priority 558. PG Strategy submodule 550 may also communicate with a Cruise Control/Forward Sensing module 514 (FIG. 9) to coordinate PG operation with strategies and controls for features associated with a Smart Adaptive Cruise Control (SACC) system such as distance control to follow a vehicle at a set distance, or speed control to follow a target velocity value.

As shown in FIG. 5, PG Strategy Submodule 550 may operate using PG Speed Target 520. For example, PG strategy Submodule 550 may communicate with the vehicle Cruise Control/Forward Sensing Module 514 via CAN 502 in order to modulate vehicle speed corresponding to the PG Speed Target 520. PG Strategy Submodule 550 may also use road condition 552, driving condition 554, driver characterization 556, and operation priority 558 system information for determining a PG Speed Target 520. PCM 510 may further receive an indication of the current vehicle speed 504 from vehicle sensors 590 and produce an output signal to vehicle actuators 570 based on vehicle speed 504 and PG Speed Target 520.

As a further example, PG Strategy Submodule 550 may communicate with the vehicle Cruise Control/Forward Sensing Module 514 via CAN 502 in order to maintain a Following Distance Target (e.g. to maintain a target following distance from a vehicle in front of the host vehicle). Further still, PG Strategy submodule 550 may communicate with the vehicle Cruise Control/Forward Sensing Module 514 via CAN 502 to maintain vehicle speed according to both a PG Speed Target 520 and a Following Distance Target.

PG Strategy Submodule 550 may also use above information (e.g. the road condition 552, driving condition 554, driver characterization 556, and operation priority 558) for PG Suspension Control 524 that outputs signals to VDCM 512. For example, PG Strategy Submodule 550 may receive input from vehicle sensors 590 via CAN 502 and determine road condition 552, driving condition 554, driver characterization 556, and operation priority 558 based on the received sensory information. PG Strategy Submodule 550 may then provide direction to set the PG Speed Target 520 and/or setpoints for the PG Suspension control 524. Furthermore PG Strategy Submodule 550 may then communicate with the vehicle Cruise Control/Forward Sensing Module 514 via CAN 502 in order to maintain a Following Distance Target, or to modulate vehicle speed corresponding to the PG Speed Target 520.

For example, PG Strategy submodule 550 may receive via CAN 502 location or route information from GPS and road sensors that communicate present and upcoming changes in road speed limits, traffic and weather conditions. As a further example, PG Strategy submodule 550 may receive information about the speed of and distance from the vehicle in front of the user's vehicle from laser, radar or ultrasonic sensors such as vehicle presence sensors 298 via CAN 502. In particular, if PG Strategy submodule 550 receives information about wet roads, a reduction in road speed limit, or slow traffic ahead, PG Strategy submodule 550 may reduce the PG Speed Target 520 and may communicate with the vehicle Cruise Control/Forward Sensing Module 514 via CAN 502 in order to increase a Following Distance Target. Subsequently, PG Strategy submodule 550 may actuate appropriate actuators of vehicle actuators 570 in order to meet the updated PG Speed Target 520 and/or Following Distance Target. Furthermore, adjustment of PG Speed Target 520 may instigate a concomitant adjustment to the Following Distance Target, and vice-versa. For example, an increase in the Following Distance Target may accompany an increase in PG Speed Target 520. Alternately, the user may manually input PG Speed Target 520 and/or a Following Distance Target.

Further still, in response to sensory input, PG Strategy submodule 550 may update PG Suspension Control parameters. For example if the PG Strategy submodule 550 increases PG Speed Target 520 in response to sensory input, PG Strategy submodule 550 may also adjust PG Suspension Control parameters to anticipate and prevent vehicle pitching. For instance, PG Strategy submodule may output a signal to VDCM 512 to firm rear wheel suspensions in order to mitigate vehicle squat as the vehicle accelerates to the higher PG Speed Target 520.

Under certain conditions, a vehicle SACC may operate in a speed-based cruise control mode, solely using an SACC Velocity Target, for example modulating vehicle speed corresponding to a PG Speed Target, when driving on a freeway under light traffic conditions, for example, where a distance d to a vehicle traveling in front of vehicle 400 is greater than a threshold distance, $d_{pg,upper}$. Under these circumstances, the Cruise Control/Forward Sensing Module 514 may not set an Following Distance Target, and may not monitor the distance, d, to a vehicle traveling in front of vehicle 400 (e.g., the host vehicle). Under certain other conditions, for example when vehicle 400 is following another vehicle, SACC may operate in adaptive cruise control mode, where both an SACC Velocity Target and an SACC Following Distance Target may be used. During adaptive cruise control mode, SACC may prioritize maintaining a distance, d, from a vehicle travelling in front of vehicle 400, and thereby adjust the SACC Velocity Target accordingly.

The configuration in FIG. 5 also comprises Driver Warning/Advisory System 560, which may receive input from PG Strategy submodule 550. For example, if PG Strategy submodule 550 receives sensory information via CAN 502 from vehicle sensors 590 indicating foggy or reduced visibility road conditions ahead, PG Strategy submodule 550 may assign an Operation Priority 558 to reducing the PG Speed Target 520, and increasing the Following Distance Target, and may send an advisory warning to the Driver 540 via the Driver Warning/Advisory System 560 and CAN 502. Driver 540 may further receive other inputs 564. In response, Driver 540, may then activate Vehicle Actuators 570, for example, turning on the vehicle lights, or the vehicle fog headlights if available, and by applying brakes to reduce vehicle speed.

Turning now to FIG. 9, CAN 502 may manage communication to and from and between several ECU modules for vehicle 400 such as VCDM 512, Cruise Control/Forward Sensing Module 514, Anti-Lock Braking System (ABS) Module 516, PCM 510 and other modules 519. As previously discussed, VDCM 512 may output signals for controlling an active or semi-active (adaptive) suspension system. Cruise Control/Forward Sensing Module 514 may include control strategies for Smart Adaptive Cruise Control (SACC), Forward Collision Warning, Collision Mitigation systems, Lane Departure Warning, and the like. ABS Module 516 may include ABS/Traction Control Systems (ABS/TCS), Electronic Stability Control/Roll Stability Control (ESC/RSC) systems, Curve control, and the like. PCM 510 may include Air-fuel Ratio Control, Variable Cam Timing, and Fuel Economy Manager systems. The Fuel Economy Manager may control Pulse & Glide strategy for the vehicle, among other functions related to maintaining or improving fuel economy. For example, Fuel Economy Manager may also send outputs to the VDCM 512 to lower the vehicle height to reduce drag when the vehicle is travelling at high speeds (e.g., freeway driving).

As an example, the ABS system may actuate the brake hydraulics to reduce hydraulic pressure and transmit brake pulsation to wheels that are rotating significantly slower than other wheels, to avoid impending wheel lock. As a further example, ESC system may sense that the vehicle has lost traction (e.g., skidding) when the intended vehicle direction determined through the steering angle does not match the actual vehicle direction of motion as determined through the lateral accelerometer, vehicle yaw, or individual wheel speeds. Accordingly, the ESC system may actuate the hydraulic brake actuators to apply the brakes to individual wheels to help return the actual vehicle direction of motion to that intended. ESC system may also work in conjunction with other ECU modules such as TCS to mitigate loss of traction and to increase vehicle stability. For example, under slippery road conditions, TCS may limit the engine torque during vehicle acceleration to below a minimum traction torque threshold, above which TCS is triggered, so as to reduce traction or energy loss due to wheel spinning.

In addition to receiving sensory input from vehicle sensors 590 via CAN 502, ECU modules 512, 514, 516, 510, and 519 may further send output signals to vehicle actuators 570. Furthermore, as discussed above for FIG. 5, CAN 502 may communicate with Driver Warning System/Driver Advisory System 560. Driver 540 may thus receive notifications from Driver Warning System/Driver Advisory System 560 related, for example to one or more of ECU modules 512, 514, 516, 510, and 519, and may also receive other inputs 564. Driver 540 may also receive sensory input information from vehicle sensors 590 and send outputs to vehicle actuators 570.

As a further example, Fuel Economy Manager may also interact with Cruise Control/Forward Sensing Module 514, by providing inputs to the SACC Velocity Target corresponding to the PG speed-control strategy. For example, PG speed-control strategy may provide inputs of a PG Speed Target, and a threshold interval for modulating the vehicle speed about the PG target speed. Based on the desired PG Speed Target and threshold interval, the Fuel Economy Manager, or another ECU where the PG speed-control strategy resides, may output an SACC Velocity Target to Cruise Control/Forward Sensing Module 514 corresponding to the PG speed-control strategy.

For example, if the PG Speed Target 520 is set at 60 miles per hour (mph), and the PG threshold interval is 10 mph, the Fuel Economy Manager (e.g., where the PG Strategy submodule 550 resides) may first output an SACC Velocity Target of 65 mph, in order to begin a pulse phase of the PG speed-control strategy. Subsequently, the Cruise Control/Forward Sensing Module 514 may increase the throttle 262 to operate one or more engine cylinders, for example, to begin acceleration of the vehicle to 65 mph. Fuel Economy Manager, upon receiving information from Vehicle Sensors 590 that the vehicle has reached the pulse phase PG Speed Target 520, may then output signal to Cruise Control/Forward Sensing Module 514 to reduce the SACC Velocity Target to 55 mph to begin a glide phase. During the glide phase, Cruise Control/Forward Sensing Module 514 may shut off the engine to decelerate the vehicle. Alternately, Cruise Control/Forward Sensing Module 514 may deactivate one engine cylinder, multiple engine cylinders, or all engine cylinders to decelerate the vehicle to the glide phase velocity target of 55 mph. During deactivation of one or multiple cylinders, the remaining active engine cylinders may continue to carry out combustion. Furthermore, during the deactivation of engine cylinders for deceleration during the glide phase, the engine may continue to rotate, or it may decrease to rest.

Further still, Cruise Control/Forward Sensing Module 514 may output a signal to VDCM 512 via CAN 502 to adjust or control an active suspension system in conjunction with SACC Velocity Target and/or SACC Following Distance Target in order to reduce vehicle pitching to maintain near-constant vehicle height and passenger comfort. For example, an increase in the SACC Velocity Target may initiate vehicle acceleration that may cause the vehicle to momentarily squat. Accordingly, the Cruise Control/Forward Sensing Module 514 may output adjustments to the VDCM 512 via CAN 502 in order to mitigate this vehicle pitching, for example, by firming the rear shocks, and/or raising the rear suspension heights. Alternately, VDCM 512 may receive an input of a change to the SACC Velocity Target and subsequently make corresponding adjustments to the suspension system.

In some cases, PCM 510 may coordinate control of the VCDM 512 with PG Strategy submodule 550 and Cruise Control/Forward Sensing Module 514 in order to anticipate changes to the SACC Velocity Target and/or SACC Following Distance Target. For example, VDCM 512 may receive SACC Velocity Target and SACC Following Distance Target as inputs from Cruise Control/Forward Sensing Module 514, and in response, VDCM 512 may pre-adjust the Active Suspension System in order to counteract or prevent vehicle pitching resulting from impending vehicle acceleration or deceleration corresponding to the changing Cruise Control/Forward Sensing Module 514 target parameters. For example, the Cruise Control/Forward Sensing Module 514 may receive sensory input of impending heavy traffic and in response, lower the SACC Velocity Target. Concurrently, VDCM 512 may, upon receiving as input the change to the SACC Velocity Target, firm or raise the front suspension in anticipation of the impending vehicle deceleration. Furthermore, Cruise Control/Forward Sensing Module 514 may communicate an advisory warning via Driver Warning/Advisory System 560 informing the driver 540 of the heavy traffic conditions ahead, and the corresponding adjustments made to the vehicle speed and suspension systems. In this manner, passengers may experience minimal or reduced discomfort due to maintaining a near-constant vehicle height and a reduction in vehicle pitching (e.g., dive) when the vehicle decelerates.

Further still, VDCM 512 control may be coordinated with PG speed-control. For example, during pulsing and gliding, PCM 510 may, based on PG parameters (e.g., target speed, modulation period, current condition within the pulse/glide operation, and the like), output a signal via CAN 502 to VDCM 512 to adjust the vehicle suspension system to maintain a constant or near constant front vehicle height or reduce disturbances to vehicle height, thereby reducing ride discomfort while maintaining fuel economy. For example, the VDCM 512 may pre-adjust one or more of the front and rear suspension systems just prior to or simultaneously with the start of the pulse (e.g., acceleration) and glide (e.g., deceleration) phases. As another example, the VDCM 512 may track the progression of the vehicle speed profile along an expected pulse/glide speed profile in order to predict upcoming changes in suspension forces due to activation and deactivation of engine cylinders. Accordingly, VDCM 512 may control the vehicle suspension system in a feed-forward manner based on the current speed as compared to the anticipated speed at which such activation or deactivation is scheduled, rejecting the disturbances to vehicle height from the pulsing and gliding phases.

Further still, the amplitude and/or period of the PG operation may be limited by the PCM 510 based on the range of authority of the suspension system, and may further depend on the average vehicle speed, road surface roughness, road grade, and trailer tow status. For example, under conditions where the vehicle is travelling on a smooth and level road, VDCM 512 may be able to control vehicle height and vehicle pitching to maintain passenger comfort, even for PG operation with larger PG amplitudes and longer PG periods (e.g., smaller PG frequencies), and thus the PG operation (amplitude, period) may not be limited, or may be limited by a lesser amount. As a further example, one or more of PG amplitude and PG period may be reduced by PCM 510 under conditions where the vehicle is traveling on a rough road, up a steep grade, or when towing a trailer or heavily loaded as compared to conditions where the vehicle is travelling on a smooth and level road, so that VDCM 512 can control vehicle height and vehicle pitch during PG operation to maintain passenger comfort without bottoming the suspension system or other degraded performance. Furthermore, when the vehicle is travelling up a steep grade, PG amplitude may be reduced as compared to when travelling on a level road in order to avoid long periods of acceleration uphill and to maintain fuel economy. As a further example, PG amplitudes and periods may be smaller for vehicles with semi-active (e.g., adaptive)

suspension systems where damping can be adjusted, as compared to PG amplitudes and periods for vehicles with active suspension systems where both damping and vehicle height may be independently controlled at each wheel.

In this manner, a vehicle may comprise an engine, a suspension system, and a controller. The controller may comprise instructions executable to modulate vehicle speed about a target speed by operating the vehicle with the engine at high output and then operating the vehicle with the engine off, and adjust operation of the suspension system based on operating the vehicle with the engine at high output and the engine off to control vehicle pitch during the modulating of vehicle speed about the target speed. Furthermore, the suspension system comprises a least one of an active suspension system and a semi-active suspension system, and the controller comprises a smart adaptive cruise control system.

Turning now to FIG. 6, it illustrates a flow chart of an example method 600 for coordinating an SACC system of the Cruise Control/Forward Sensing Module 514 with PG speed-control (PG Strategy submodule 550) and the VDCM 512 to reduce passenger discomfort while maintaining fuel economy. Method 600 begins at 610, where the vehicle operating conditions may be obtained, for example, via vehicle sensors 590. Method 600 continues at 620, where it may determine if the vehicle 400 is operating in a Quasi-Straight line (QS) driving manner. PCM 510 may determine if vehicle 400 is operating in a QS driving manner from sensory information. For example, if the driver steering wheel angle is below a threshold steering angle, or an electronic horizon (EH) sensor indicates a straight road ahead in the driving route, it may be determined that the vehicle is operating in a QS driving manner. If the vehicle is not operating in a QS driving manner, method 600 ends. For example, to maintain vehicle operability, PG speed-control strategy may not be activated when the vehicle is not operating in a QS driving manner, such as during high traffic urban driving.

If the vehicle is operating in a QS driving manner, method 600 may continue at 630 where it may determine if the distance from another vehicle in front of vehicle 400 (e.g., the host vehicle), d, is greater than $d_{pg,upper}$, a PG speed-control strategy upper distance. The distance, d, to another vehicle in front of vehicle 400 may be determined using one or more of vehicle presence sensors 298, for example, one or more of radar, laser, video, infrared, ultrasound, and image sensors. If $d>d_{pg,upper}$, for example during light freeway traffic conditions, method 600 may continue at 640 and determine if speed-based cruise control, (e.g., SACC based on only SACC Velocity Target) is activated. For example, method 600 may determine if SACC has been activated by Cruise Control/Forward Sensing Module 514 via driver input. If speed-based cruise control is off, then method 600 ends.

Next, method 600 may continue at 650, where it may determine if Quasi-Straight line driving Pulse & Glide (QSPG) strategy of PG Strategy submodule 550 is active. If QSPG is off, method 600 ends. Otherwise, method 600 continues at 660 where control of the suspension system, e.g. an active suspension system, may be coordinated using VDCM 512 with QSPG and the speed-based cruise control. FIG. 7 provides further example details of how suspension control may be coordinated with QSPG operation using speed-based cruise control.

Continuing from FIG. 6 at 630, if $d<d_{pg,upper}$, method 600 continues at 636 where it determines if distance, d, to another vehicle in front of vehicle 400 is greater than $d_{pg,lower}$, a PG speed-control strategy lower distance, and less than $d_{pg,upper}$. If $d<d_{pg,lower}$, method 600 ends. If $d_{pg,lower}<d<d_{pg,upper}$, then method 600 continues at 646 where it determines if the SACC is operating in adaptive cruise control mode. If SACC is not operating in adaptive cruise control mode, then method 600 ends. Otherwise, method 600 continues at 656 where it determines if the Adaptive Quasi-Straight line driving Pulse & Glide (AQSPG) mode is on. If AQSPG is off, then method 600 ends. Otherwise, method 600 continues at 670 where suspension control is coordinated to assist AQSPG operation with adaptive cruise control. FIG. 8 provides further example details of how suspension control may be coordinated to assist with AQSPG operation with adaptive cruise control.

Turning now to FIG. 7, it illustrates an example method 700 for coordinating speed-based cruise control of Cruise Control/Forward Sensing Module 514 with control of the suspension system, for example an active suspension system, via VDCM 512, and PG speed-control strategy. Method 700 begins at 710, where it determines if the PG speed-control strategy is currently in a pulse phase. If the vehicle 400 is currently operating in a pulse phase, method 700 continues at 720 where it determines if vehicle 400 has an active suspension system. If the vehicle has an active suspension system, method 700 continues at 730 where Quasi-Straight line driving Pulse (QSP) leveling is performed. For example, during pulse phases, heavy throttle application or operation of one or more cylinders to increase vehicle speed can lead to vehicle nose-up and rear-down (e.g., vehicle squat) increasing passenger discomfort and vehicle air resistance. To counteract vehicle squat, QSP Leveling may reduce front suspension heights, increase rear suspension heights, and firm the rear suspension, or one or more thereof, in order to maintain a constant or near-constant vehicle height during the pulse phase. In addition, QSP Leveling may also pre-position one or more of the vehicle heights and pre-adjust suspension actuators just prior to or at the start of the pulse phase in anticipation of the impending pulse phase disturbance. In this manner, vehicle pitching induced by vehicle acceleration during pulsing can be further reduced. Next, method 700 continues at 750 where QSP Traction Firming may be performed. For example, QSP Traction Firming may firm one or more of the wheel suspension systems to increase fraction at one or more wheels. As a further example, during the pulse phase, if the throttle 262 is above a threshold engine throttle, QSP Traction Firming may firm one or more of the wheel suspension systems to increase or fully utilize the traction capabilities at one or more wheels. As a further example, suspension damping may be engaged to its maximum value when the engine is above a threshold engine throttle, in order to provide traction firming.

Returning to method 700 at 720, if vehicle 400 does not have an active suspension system, method 700 continues at step 740, where QSP Motion Damping may be performed for vehicles equipped with semi-active (adaptive) suspension systems or controllable dampers (e.g., shocks). For example, suspension damping may be increased so as to damp out the transition pitching motion due to the pulse. Next, Method 700 continues at 760 where QSP Traction Damping is performed. For example, suspension damping at one or more wheels may be increased to increase traction. As a further example, suspension damping at one or more wheels may be increased to the maximum value when the throttle 262 is above an engine throttle threshold to increase or fully utilize the traction capabilities at one or more wheels.

Returning to method 700 at step 710, if the PG speed-control strategy is currently operating in a glide phase, method 700 continues to 770 where it determines if vehicle 400 has an active suspension system. If vehicle 400 has an active suspension system, method 700 continues at 780 where Quasi-straight line Driving Glide (QSG) Leveling is performed. For example, QSG Leveling may first zero out any suspension height adjustments used during the pulse phase (e.g., during QSP Leveling). Furthermore, during glide phases, sudden deceleration after shutting off the engine or deactivating one or more cylinders may lead to vehicle nose-down (e.g., vehicle dive) which can increase passenger discomfort. QSG Leveling can adjust one or more wheel suspensions heights and can firm the front suspension to maintain constant or near-constant vehicle heights. In addition, QSG Leveling may pre-position and pre-fill the suspension actuators just prior to or at the start of the glide phase, in anticipation of the impending glide disturbance. In this manner vehicle pitching resulting from the glide phase deceleration can be further reduced.

If vehicle 400 does not have an active suspension system, method 700 continues at step 790, where QSG Motion Damping may be performed for vehicles equipped with semi-active (adaptive) suspension systems or controllable dampers (e.g., shocks). For example, suspension damping may be increased so as to damp out the transition pitching motion during the engine throttle drop-off when the engine is shut off.

As a further example, if vehicle 400 is travelling on a slippery road surface (e.g., indicated by one or more of vehicle sensors 590), the vehicle TCS may limit the engine torque below a threshold engine torque triggering TCS activation during pulse phases so as to reduce fraction or energy loss due to wheel spinning. Under these conditions, engine torque application during pulse phases may still generate wheel slip, but the wheel slip will be below the TCS activation slip ratio. Furthermore, the PG Strategy submodule 550 may switch to Quasi-straight line driving Damping Pulse (QSDP) TCS mode, during which the suspension is firmed via VDCM 512 at all times in order to increase vehicle traction.

After performing any one of 750, 760, 780, and 790, method 700 returns to 660 of FIG. 6 from where it originated.

Turning now to FIG. 8, it illustrates an example method 800 for AQSPG, coordinating adaptive cruise control of Cruise Control/Forward Sensing Module 514 with control of the suspension system, for example an active suspension system via VDCM 512, and PG speed-control strategy. Method 800 begins at 820 where vehicle PG operating conditions are determined such as distance, d, of a vehicle in front of vehicle 400, peak pulse vehicle speed $v_{ppeak}$, minimum glide vehicle speed $v_{gmin}$, pulse duration $t_p$, and glide duration $t_g$. Peak pulse vehicle speed and minimum glide vehicle speed can be determined from the PG target speed and the PG threshold interval, while pulse duration and glide duration can be determined from the PG modulation period. Next, method 800 continues at 840 where PG operating conditions are optimized based on distance, d. For example, $t_p$ and $t_g$ may be used to schedule suspension control, including pre-adjusting vehicle suspension systems (e.g., an active suspension system via VDCM 512) to anticipate PG operation and maintain constant or near-constant vehicle heights while maintaining fuel economy and reducing passenger discomfort, and while maintaining a distance, d, from a vehicle travelling in front of vehicle 400. Furthermore, optimization of AQSPG may be performed based on more advanced optimization algorithms. For example, AQSPG may coordinate control of several systems such as ESC/RSC and ABS/TCS of ABS Module 516 and Lane Departure Warning system of Cruise Control/Forward Sensing Module 514, VDCM 512, and PCM 510 in conjunction with operation of the vehicle in AQSPG to maintain vehicle height, reduce passenger discomfort and maintain fuel economy.

In this manner, a method may comprise modulating vehicle speed about a target speed by repeatedly operating one or more engine cylinders to increase vehicle speed, and then deactivating one or more engine cylinders to reduce vehicle speed, and adjusting a vehicle suspension system based on the cylinder operation to control vehicle pitch during the vehicle speed modulation. Furthermore, modulating the vehicle speed about the target speed may comprise modulating the vehicle speed about the target speed over a threshold interval, operating one or more engine cylinders to increase vehicle speed may comprise accelerating the vehicle over the threshold interval about the target speed, and deactivating one or more engine cylinders to reduce vehicle speed may comprise decelerating the vehicle over the threshold interval about the target speed.

Further still, adjusting the suspension system may comprise adjusting operation of an active suspension system or adjusting operation of a semi-active suspension system. Adjusting operation of the suspension system may comprise maintaining a constant front vehicle height during the modulating of vehicle speed about the target speed by adjusting at least one of a front suspension height, a rear suspension height, a front suspension damping, and a rear suspension damping. Adjusting operation of the active suspension system may further comprise at least one of adjusting a front suspension height and adjusting a rear suspension height, firming a front suspension and firming a rear suspension. Further still, adjusting operation of the semi-active suspension system may comprise increasing suspension damping, including increasing the suspension damping to its maximum value when an engine throttle is above a threshold engine throttle.

Modulating the vehicle speed over the threshold interval may be performed by a cruise control system onboard the vehicle. Furthermore, adjusting the suspension system may at least one of pre-positioning the suspension heights and pre-filling the suspension actuators just prior to accelerating and decelerating the vehicle over the threshold interval via the cruise control system. Pre-positioning the suspension heights and pre-filling the suspension actuators may be performed by a control system on board the vehicle based on at least one of the target speed, the threshold interval, a modulation frequency for modulating the vehicle speed over the threshold interval about the target speed, and a distance from a second vehicle traveling in front of the vehicle.

Modulating the vehicle speed may further comprise limiting the threshold interval and/or the modulation frequency based on one or more of the target speed, a road surface roughness, a road grade, and a trailer tow status. Modulating a vehicle speed may further comprise modulating a hybrid electric vehicle speed.

Furthermore, a method may comprise during vehicle-controlled speed regulation, operating one or more engine cylinders to increase the vehicle speed, and then deactivating one or more engine cylinders to reduce the vehicle speed without a change in driver pedal request, and adjusting a vehicle suspension system responsive to the vehicle-controlled speed regulation and in coordination with timing of the increase and decrease in vehicle speed. Further still, all engine cylinders may be fully activated to increase vehicle speed, and all cylinders may be fully deactivated, but still rotating, to decrease vehicle speed.

As explained above, the method of controlling the vehicle, such as during cruise-control operation, may include operating one or more engine cylinders to increase the vehicle speed, and then deactivating one or more engine cylinders to reduce the vehicle speed without a change in driver pedal request. In synchronism with this periodic cruise-control operation, the method may further include adjusting a vehicle suspension system responsive to the vehicle-controlled speed regulation and in coordination with timing of the increase and decrease in vehicle speed. The coordination can take into account expected minimum and maximum vehicle speeds, and thus may predict based on current vehicle speed and acceleration/deceleration, a timing of such transitions and thus control the suspension based on such anticipated timing.

Note that the example process flows described herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily called for to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-8, V-10, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims are to be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A method, comprising:
  modulating a vehicle speed about a target speed during cruise control operation by repeatedly operating one or more engine cylinders to increase the vehicle speed, and then deactivating one or more engine cylinders to reduce the vehicle speed, via a control system; and
  adjusting a vehicle suspension system based on the cylinder operation to control vehicle pitch during the vehicle speed modulation.

2. The method of claim 1, wherein modulating the vehicle speed about the target speed comprises modulating the vehicle speed about the target speed over a threshold interval.

3. The method of claim 2, wherein operating one or more engine cylinders to increase the vehicle speed comprises accelerating the vehicle over the threshold interval about the target speed and wherein deactivating one or more engine cylinders to reduce vehicle speed comprises decelerating the vehicle over the threshold interval about the target speed.

4. The method of claim 3, wherein adjusting the suspension system includes adjusting operation of an active suspension system via the control system.

5. The method of claim 3, wherein adjusting the vehicle suspension system comprises adjusting operation of a semi-active suspension system via the control system.

6. The method of claim 4, wherein adjusting operation of the vehicle suspension system comprises reducing disturbances to front vehicle height during the modulating of vehicle speed about the target speed by adjusting at least one of a front suspension height, a rear suspension height, a front suspension damping, and a rear suspension damping, via the control system.

7. The method of claim 4, wherein adjusting operation of the active suspension system comprises at least one of adjusting a front suspension height and adjusting a rear suspension height via the control system.

8. The method of claim 7, wherein adjusting operation of the active suspension system further comprises at least one of firming a front suspension and firming a rear suspension, via the control system.

9. The method of claim 5, wherein adjusting operation of the semi-active suspension system comprises increasing a suspension damping via the control system.

10. The method of claim 9, wherein increasing the suspension damping comprises increasing the suspension damping to its maximum value when an engine throttle is above a threshold engine throttle.

11. The method of claim 3, wherein modulating the vehicle speed over the threshold interval is performed by a cruise control system onboard the vehicle, wherein the control system includes the cruise control system.

12. The method of claim 11, wherein adjusting the vehicle suspension system comprises at least one of pre-positioning suspension heights and pre-filling suspension actuators based on upcoming vehicle acceleration and deceleration over the threshold interval via the cruise control system.

13. The method of claim 12, wherein pre-positioning the suspension heights and pre-filling the suspension actuators is performed by a control system on board the vehicle based on at least one of the target speed, the threshold interval, a modulation frequency for modulating the vehicle speed over the threshold interval about the target speed, and a distance from a second vehicle traveling in front of the vehicle.

14. The method of claim 13, wherein modulating the vehicle speed further comprises limiting the threshold interval based on one or more of the target speed, a road surface roughness, a road grade, and a trailer tow status.

15. The method of claim 13, wherein modulating the vehicle speed further comprises limiting the modulation frequency based on one or more of the target speed, a road surface roughness, a road grade, and a trailer tow status.

16. A vehicle, comprising:
  an engine;
  a suspension system; and
  a control system including one or more controllers, a network, and one or more memories with instructions executable stored therein to modulate a vehicle speed about a target speed by operating the vehicle with the engine at increased output and then with the engine off, and adjust suspension system operation based on the vehicle operation to control vehicle pitch during the modulating of the vehicle speed about the target speed.

17. The vehicle of claim 16, wherein the suspension system comprises a least one of an active suspension system and a semi-active suspension system.

18. The vehicle of claim 17, wherein the control system comprises a smart adaptive cruise control system.

19. A method for a control system of a vehicle, comprising:
via the control system: during vehicle-controlled speed regulation, operating one or more engine cylinders to increase the vehicle speed, and then deactivating one or more engine cylinders to reduce the vehicle speed without a change in driver pedal request; and
adjusting a vehicle suspension system responsive to the vehicle-controlled speed regulation and in coordination with timing of the increase and decrease in vehicle speed.

20. The method of claim 19, wherein all engine cylinders are fully activated to increase vehicle speed, and all cylinders are fully deactivated, but still rotating, to decrease vehicle speed.

* * * * *